(12) United States Patent
Lee

(10) Patent No.: US 7,478,934 B2
(45) Date of Patent: Jan. 20, 2009

(54) LAMP ASSEMBLY AUTOMATICALLY CONTROLLING MAIN BEAM DIRECTION AND ADDITIONAL BEAM DIRECTION

(75) Inventor: Dong-Mok Lee, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 11/709,094

(22) Filed: Feb. 21, 2007

(65) Prior Publication Data

US 2007/0291487 A1 Dec. 20, 2007

(30) Foreign Application Priority Data

Jun. 16, 2006 (KR) ...................... 10-2006-0054565

(51) Int. Cl.
*F21V 19/02* (2006.01)
*F21V 21/14* (2006.01)

(52) U.S. Cl. ........................ 362/538; 362/514; 362/524; 362/526

(58) Field of Classification Search ................. 362/523, 362/538, 507, 512–514, 530–532, 464, 467, 362/508, 524, 526, 539, 263, 285, 286, 418, 362/419, 422–425, 449
See application file for complete search history.

(56) References Cited

U.S. PATENT DOCUMENTS

| | | | | |
|---|---|---|---|---|
| 6,960,006 | B2 * | 11/2005 | Abe ........................... | 362/538 |
| 7,165,872 | B2 * | 1/2007 | Suzuki et al. ............... | 362/538 |
| 2002/0085387 | A1 * | 7/2002 | Taniuchi ..................... | 362/538 |
| 2005/0063193 | A1 * | 3/2005 | Yamamura et al. .......... | 362/538 |
| 2005/0201117 | A1 * | 9/2005 | Sugimoto et al. ........... | 362/539 |

FOREIGN PATENT DOCUMENTS

JP 2003-197012 11/2003

* cited by examiner

*Primary Examiner*—Bao Q Truong
(74) *Attorney, Agent, or Firm*—Edwards Angell Palmer & Dodge LLP; Peter F. Corless

(57) ABSTRACT

Provided is an automotive lamp assembly that can dynamically control the amount and direction of side radiation of light, as a vehicle travels along a curved road. The lamp assembly includes a projection lamp module including a light source, a reflecting mirror reflecting light emitted from the light source forward, and a lens refracting and condensing the forward reflected light; a rotative actuator rotating the module about a predetermined driving axis; and an additional reflecting mirror rotating with the module and reflecting light intercepted by a shield to make the light travel at an angle in a direction proportionate to the rotation.

8 Claims, 17 Drawing Sheets

LAMP ASSEMBLY AUTOMATICALLY CONTROLLING MAIN BEAM DIRECTION AND ADDITIONAL BEAM DIRECTION

CROSS REFERENCE TO RELATED APPLICATION

This application claims priority from Korean Patent Application No. 10-2006-54565 filed on Jun. 16, 2006 in the Korean Intellectual Property Office, the disclosure of which is incorporated herein by reference in its entirety.

BACKGROUND OF THE INVENTION

1. Field of the Invention

The present invention relates to an automotive lamp assembly, and more particularly, to an automotive headlamp that dynamically controls the radiation direction as a vehicle travels on a curved road.

2. Description of the Related Art

As for conventional dynamic bending lamps, as a vehicle travels on a curved road, lamps rotate left/right according to the angle of a steering wheel and velocity of the vehicle. The above rotation of lamps allows a driver to have a better visual field on a curved road. However, in the related art, lamps were not able to sufficiently rotate to desired angles with considerable curvature or crossroads due to limitation in the lamps's structure.

FIG. 1 is a view illustrating the operational principle of a dynamic bending lamp in the related art. As a vehicle 5, which has provided a beam pattern 1, enters a curved road 3, headlamps rotate left according to the rotational angle of the steering wheel, and a beam pattern 2 is formed on the road surface in a direction (yaw direction) according to an angle of the traveling direction of the vehicle. As a result, a wider road range is visually improved for the driver.

A technology that embodies a dynamic bending lamp by adding an individual partial reflecting mirror and a driving mechanism to the lamp to rotate is disclosed in Japanese Patent Application Publication No. 2003-197012. An automotive headlamp disclosed in the patent document includes a light source with a mounted hood, a fixed reflector, a driving hood that has a rotatable movable reflector and rotates according to the rotation of the movable driving reflector to variously distribute light, and a fixed hood that intercept light from the light source for the fixed reflector. However, the headlamp can not also rotate at a sufficient angle, in order to radiate light to a region having a considerably large curvature on the curved road 3, as described above.

On the other hand, lamps should also be able to rotate to increase a driver's visual field at crossroads, so that a technology has been developed by individually adding a lamp module including an additional light source and reflecting mirror, or an additional driving source. However, by adding an inexpensive halogen light source and a reflecting mirror, light emitted from the above-described light source has a different quality than the white light emitted from an HID (High Intensity Discharge) and may be regarded as a special signal due to flickering. Further, it is difficult to secure sufficient space and flexibility in designing when a lamp module is added.

SUMMARY OF THE INVENTION

An object of the present invention is to provide a mechanism that allows an additional reflecting mirror, which is provided in a projection lamp that rotates according to an angle of a steering wheel and velocity of a vehicle, to rotate according to the rotation of the projection lamp.

Another object of the present invention is to provide a mechanism that rotates the projection lamp and the reflecting mirror using one driving unit.

Objects of the present invention are not limited to those mentioned above, and other objects of the present invention will be apparently understood by those skilled in the art through the following description.

According to an aspect of the present invention, there is provided a lamp assembly including a projection lamp module having a light source, a reflecting mirror reflecting light emitted from the light source forward, and a lens refracting and condensing the forward reflected light; a rotative actuator rotating the module about a predetermined driving axis; and an additional reflecting mirror rotating with the module and reflecting light intercepted by a shield to make the light travel at an angle in a direction proportionate to the rotation.

BRIEF DESCRIPTION OF THE DRAWINGS

The above and other features and advantages of the present invention will become more apparent by describing in detail preferred embodiments thereof with reference to the attached drawings, in which.

DESCRIPTION OF THE PREFERRED EMBODIMENTS

Figure 1:
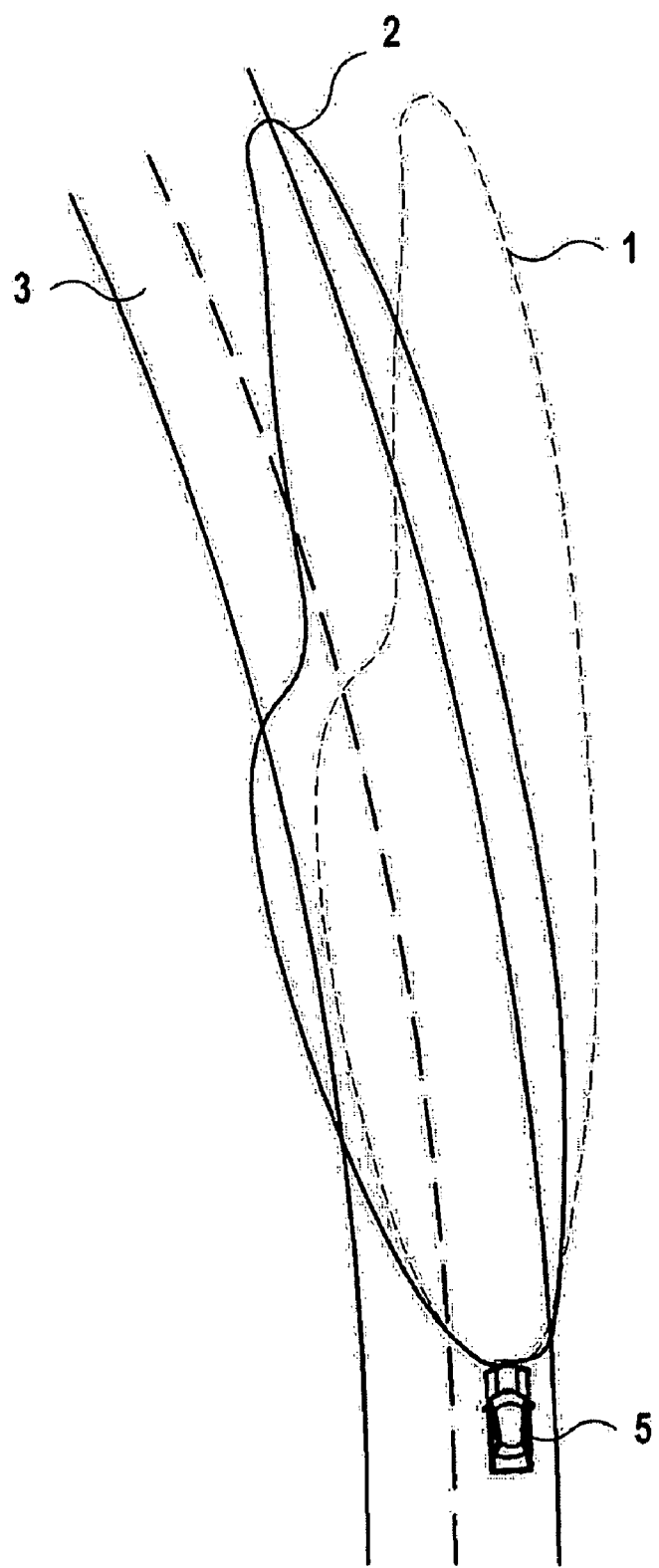
FIG. 1 is a view illustrating the operational principle of a bending lamp in the related art.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Figure 2:
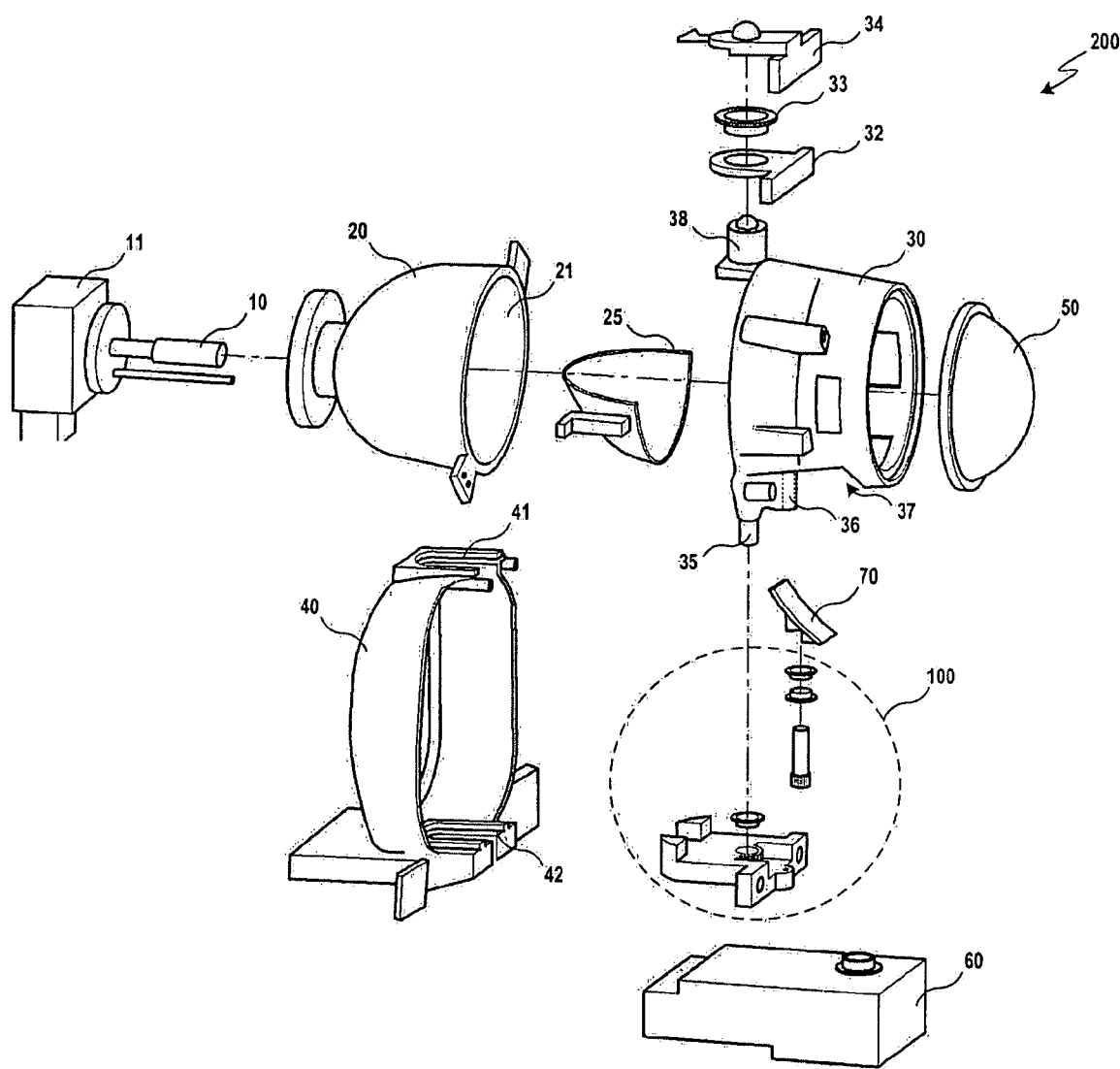
FIG. 2 is a perspective exploded view of an automotive lamp assembly according to an embodiment of the invention.

FIG. 2 is a perspective exploded view of an automotive lamp assembly 200 according to an embodiment of the invention. The automotive lamp assembly 200 may include a light source 10, a reflector unit 20, a shield unit 25, a rotary unit 30, a fixed unit 40, a lens 50, a planetary gear unit 100, an additional reflecting mirror 70, and a rotative actuator 60. The light source 10, reflector unit 20, shield unit 25, and lens 50 integrally rotate with the rotary unit 30. The above parts that integrally rotate may be generically defined as a projection lamp module.

Receiving power from a predetermined power source 11 and emitting light, the light source 10 may be an HID (High Intensity Discharge), a halogen bulb, or an LED (Light Emitting Diode) etc.

The reflector unit 20 accommodates the light source 10 and reflects light emitted from the light source 10 forward using a main reflecting mirror 21 provided inside. In general, the main reflecting mirror 21 of a projection type is partially formed in an ellipse shape and the light source 10 is positioned at one of two focuses of the ellipse.

Figure 3:
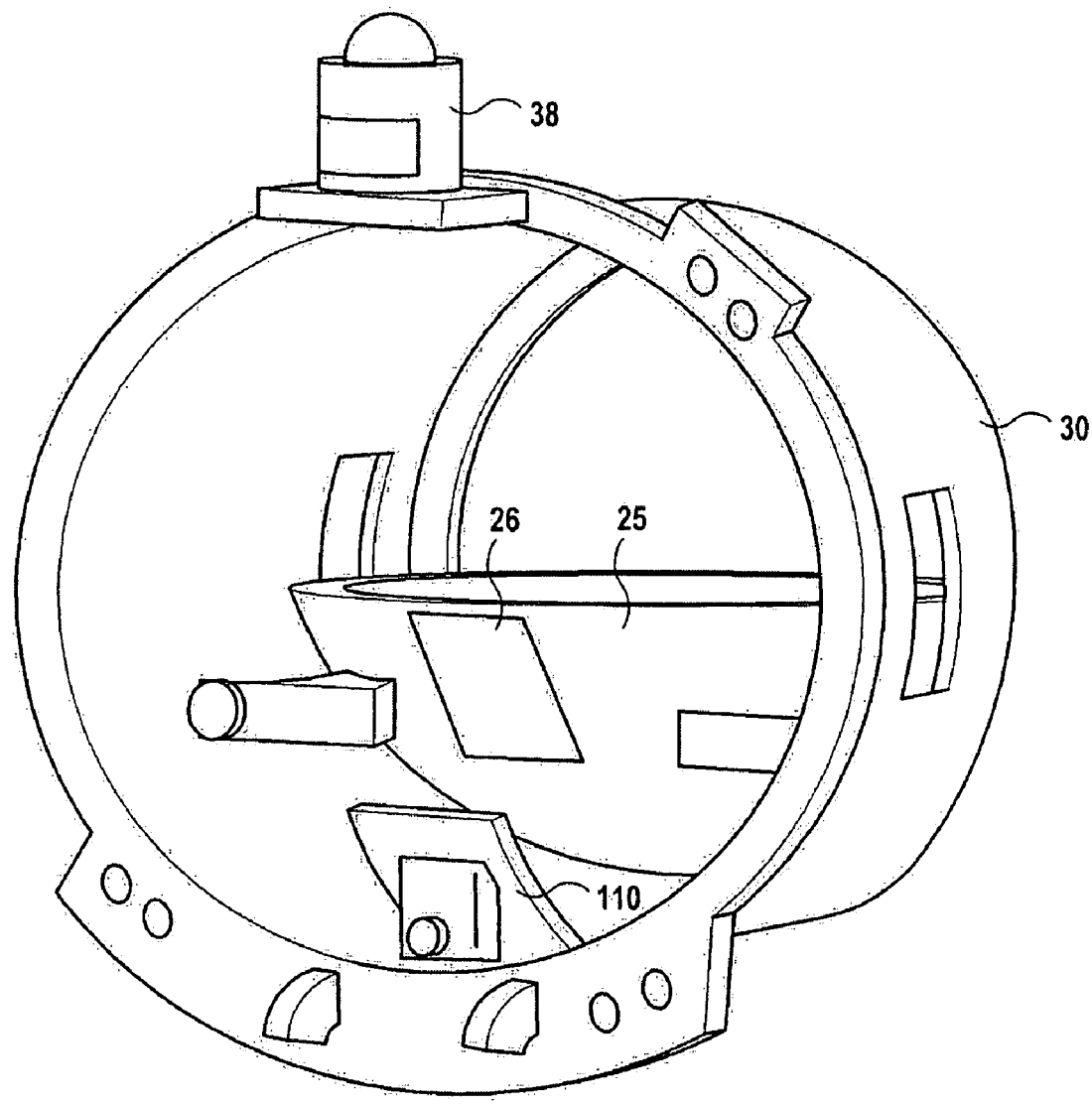
FIG. 3 is a view showing a rotary unit with a shield unit seen from the back.

The shield unit 25 has a certain outline at the top and intercepts a part of the light reflected forward from the main reflecting mirror 21 to form a low beam pattern. In a projection lamp with the light source at the first focus (f1 of FIG. 11), light reflected from the main reflecting mirror 21 substantially passes the second focus (f2 of FIG. 11). When the light is reflected from the main reflecting mirror 21, light traveling below the second focus is intercepted by the shield unit 25 at a low beam mode. Light that is not intercepted by the shield unit forms a low beam pattern, following the outline of the shield unit. According to an embodiment of the invention, an inverse reflecting mirror (26 of FIG. 3) is provided on the outside of the shield unit 25, i.e. the surface facing the light source to reflect the light intercepted by the shield unit 25 to the additional reflecting mirror 70.

The rotary unit 30 rotates about an imaginary rotational axis formed by connecting a lower rotational shaft 35 and an upper rotational shaft 38. The lower rotational shaft 35 receives rotatory force from the rotative actuator 60. The upper rotational shaft 38 is inserted into an upper bracket 32 through a bearing 33. The upper bracket 32 is fixedly fitted into an upper slot 41 of the fixed unit 40, and then its upper side is closed by a cover 34.

A cylindrical hole 36 is formed at a position in the rotary unit 30 that is off-set at a predetermined distance forward from the lower rotational shaft 35. Further, an opening 37 is formed at the lower side of the rotary unit 30 to make light reflected from the additional reflecting mirror 70 travels in a lateral direction.

The lens 50 is coupled to the front opening of the rotary unit 30. For example, the lens 50 is an aspherical lens and refracts the light substantially forward that is reflected from the main reflecting mirror 21 and reaches the lens, not intercepted by the shield unit 25. On the other hand, the reflector unit 20 is coupled to the rear opening of the rotary unit 30. Therefore, as the rotary unit 30 rotates, the reflector unit 20 and the light source 10 rotate.

The fixed unit 40 is combined with the rotative actuator 60 and does not move. The fixed unit 40 allows the rotary unit 30 to rotate only about the imaginary axis formed by the lower and upper rotational shafts 35 and 38 and fixes the rotary unit 30 to prevent any movement other than the rotation. To achieve the above function, the bracket 32 with the upper rotational shaft 38 and the bearing 33 is fitted in the upper portion of the fixed unit 40. A lower slot 42 is formed at the lower portion of the fixed unit 40, in which the lower rotational shaft 35 is inserted and a lower bracket 130 that is provided with a sun gear used to rotate the additional reflecting mirror is also fitted.

As the rotary unit 30 rotates, the planetary gear unit 100 proportionately rotates the additional reflecting mirror 70. The rotating amount of the additional reflecting mirror depends on the gear ratio of the sun gear and planetary gear. The planetary gear unit 100 is described later in more detail in reference to FIGS. 4 through 7.

The additional reflecting mirror 70 is rotated by rotatory force provided from the planetary gear unit 100 and reflects light that is reflected from the inverse reflecting mirror (26 of FIG. 3) in a direction corresponding to the rotation.

The rotative actuator 60 is directly connected with the lower rotational shaft 35 and rotates the rotary unit 30 at a predetermined angle. The angle may be controlled such that it is proportional to the rotational angle of a steering wheel. The rotative actuator 60, for example, may be a stepping motor.

Figure 4:
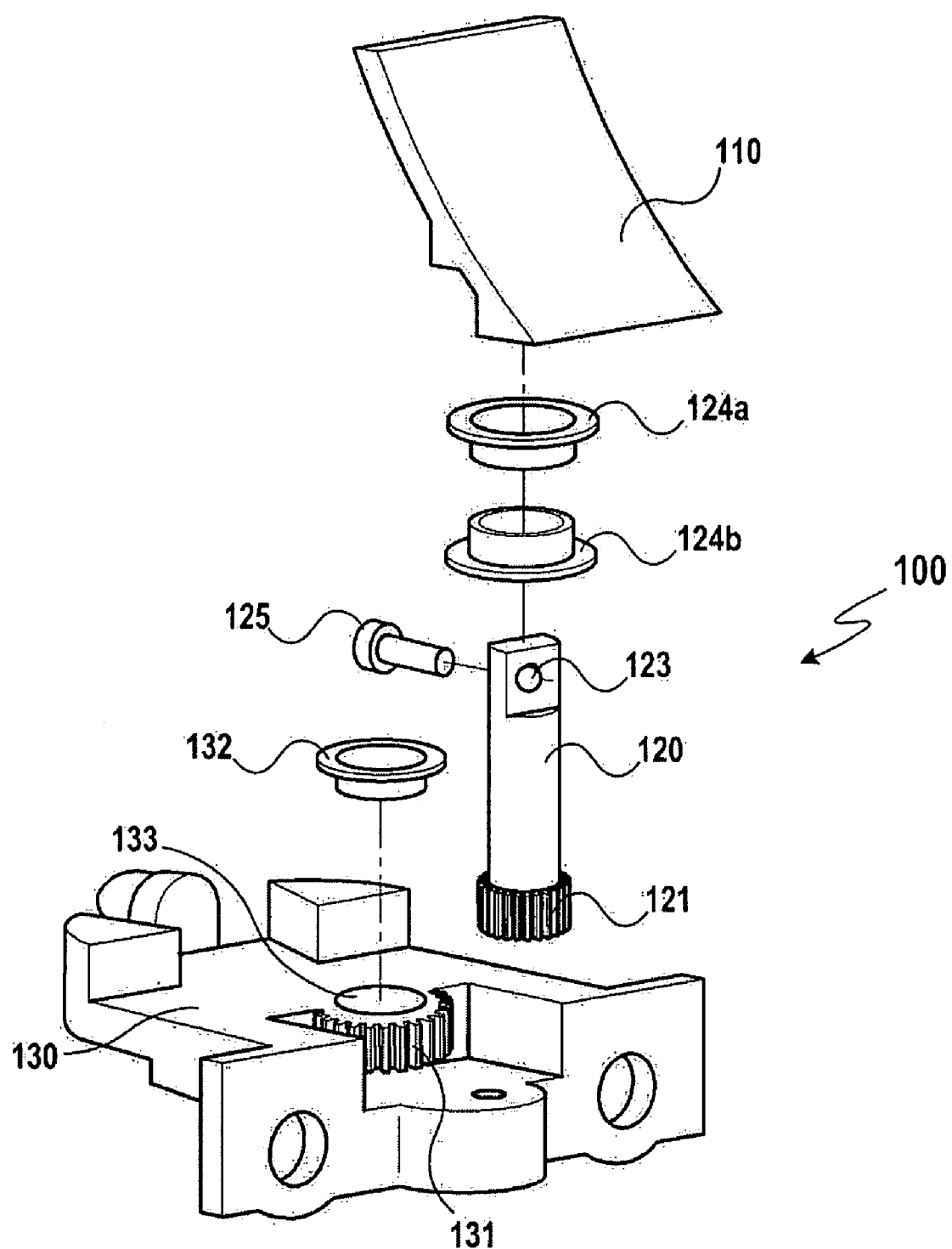
FIG. 4 is a view showing a planetary gear unit in detail.

FIG. 4 is a view showing the planetary gear unit 100 in more detail.

The planetary gear unit 100 may include the additional reflecting mirror shaft 120 that is joined with the additional reflecting mirror 70 to rotate the additional reflecting mirror 70 and the lower bracket 130.

The sun gear 131 is formed at the upper portion of the lower bracket 130 and a cylindrical hole 133 is formed at the center of the sun gear 131 to insert the lower rotational shaft 35. A bearing 132 is disposed between the lower rotational shaft 35 and the cylindrical hole 133 to allow the lower rotational shaft 35 to rotate about the central axis of the cylindrical hole 133.

A planetary gear 121 is formed at one end of the additional reflecting mirror shaft 120. The planetary gear 121 is engaged with the sun gear 131 with a predetermined gear ratio. The additional reflecting mirror 110 is connected to the other end of the additional reflecting mirror shaft 120 and a pin hole 123 is formed through the shaft 120 for the connection.

The process connecting the additional reflecting mirror 110 to the additional reflecting mirror shaft 120 is as follow.

To begin with, the additional reflecting mirror shaft 120 is fitted into the cylindrical hole (36 of FIG. 2). In the above fitting, the additional reflecting mirror shaft 120 is inserted into a first bearing 124a and a second bearing 124b that are disposed at the upper and lower portion of the cylindrical hole 36, respectively. Subsequently, the additional reflecting mirror 110 is connected to the upper end of the additional reflecting mirror shaft 120 passing through the cylindrical hole 36 and then fixed by a pin 125.

Because the additional reflecting mirror shaft 120 is fitted in the cylindrical hole 36 as described above, as the rotary unit 30 rotates, the planetary gear formed on the additional reflecting mirror shaft 120 rotates on its own axis and simultaneously revolves round the sun gear 131.

Figure 5:
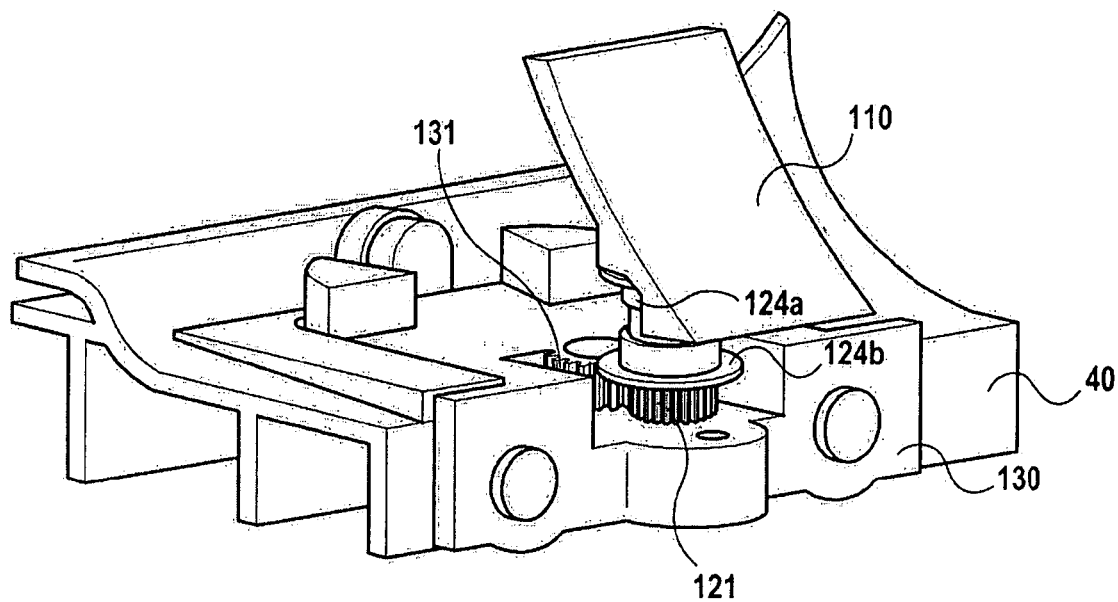
FIG. 5 is a view illustrating the combination of an additional reflecting mirror shaft and an additional reflecting mirror.

In FIG. 5, the additional reflecting mirror 70 is connected to the additional reflecting mirror shaft 120 and the sun gear 131 is engaged with the planetary gear 121. However, the lower rotational shaft 35 of the rotary unit 30 and the cylindrical hole 36 are not shown in FIG. 5.

Figure 6:
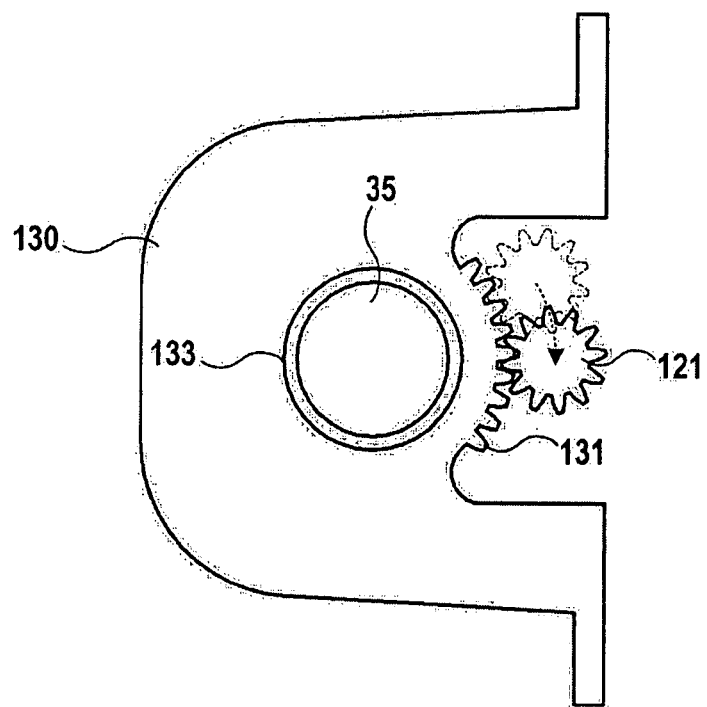
FIG. 6 is a view illustrating the rotation and revolution of the planetary gear.
Figure 7:
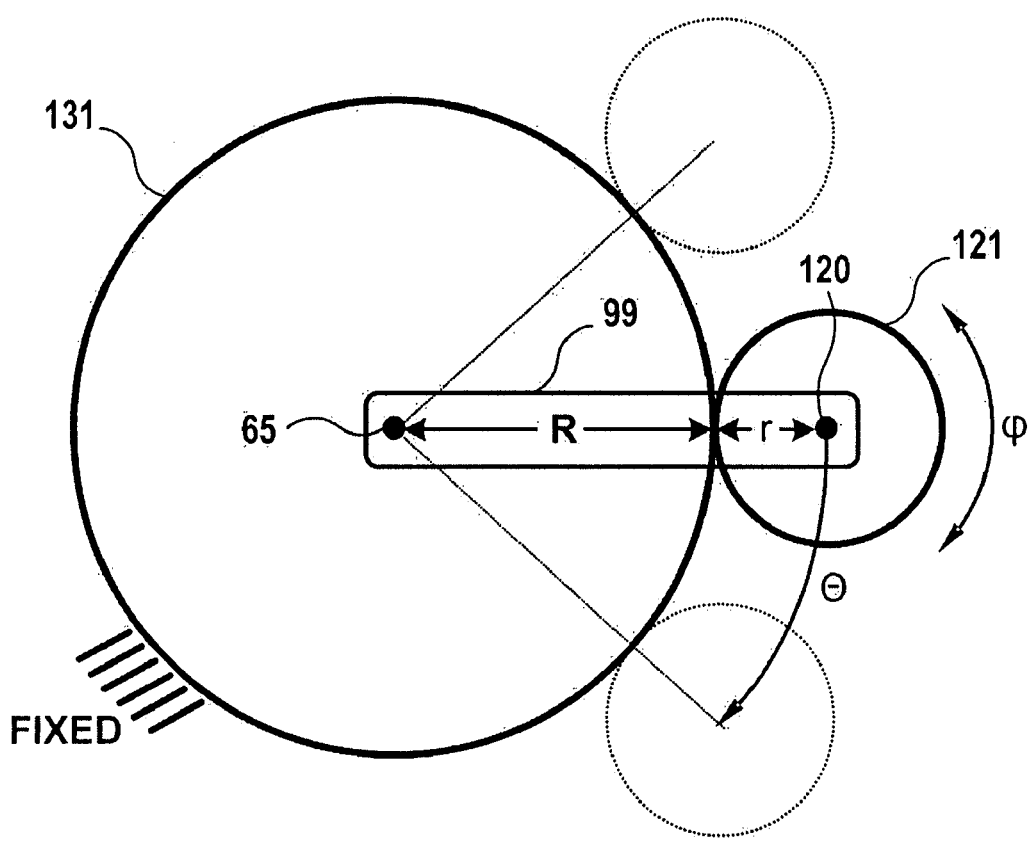
FIG. 7 is a view for designing the motion of the additional reflecting mirror.

FIG. 6 is a view illustrating the movement of rotation and revolution of the planetary gear 121 that is engaged with the sun gear 131 formed in the lower bracket 130, and FIG. 7 is a view for designing the movement and rotational angle of the additional reflecting mirror shaft 120.

As for the mechanism of the planetary gear unit 100, the pitch circle of the sun gear 131 is constructed with respect to the center point of the lower rotary shaft 35 and the pitch circle of the planetary gear 121 is constructed with respect to the center point of the additional reflecting mirror shaft 120, and the rotary unit 30 that functions as an arm 99 is disposed between the centers. While rotating about the center point of the pitch circle of the sun gear 131, the arm rotates the additional reflecting mirror shaft 120, and the rotational axis of the additional reflecting mirror shaft 20 passes the focus of the additional reflecting mirror 70.

When the radiuses of the pitch circles of the sun gear 131 and the planetary gear 121 are R and r, the distance between the rotational centers is R+r. Further, when the revolutionary angle and the rotational angle of the additional reflecting mirror shaft 120 are θ and φ, they satisfy the following formula, $$R \times \theta = r \times \phi \qquad \text{[Formula 1]}$$

The formula 1 can be rearranged as R/r=φ/θ, where the revolutionary angle θ is the same as the rotational angle of the rotary unit 30 and the rotational angle φ is the same as the rotational angle of the additional reflecting mirror shaft 120. By adjusting the ratio of R/r, it may be determined how the additional reflecting mirror 70 can further rotate as compared with the rotary unit 30. For example, when R/r is 3, the additional reflecting mirror 70 additionally rotates three times the rotary unit 30. Although the rotary unit 30 rotates just 15 degrees on a curved road, 45 degrees is added to the rotational angle of the additional reflecting mirror 70, thus it has the effect of rotating 60 degrees in total with respect to the traveling direction of a vehicle. The above relationship is satisfied as far as the gear module of the sun gear 131 corresponds with the gear train of the planetary gear 121.

Figure 8:
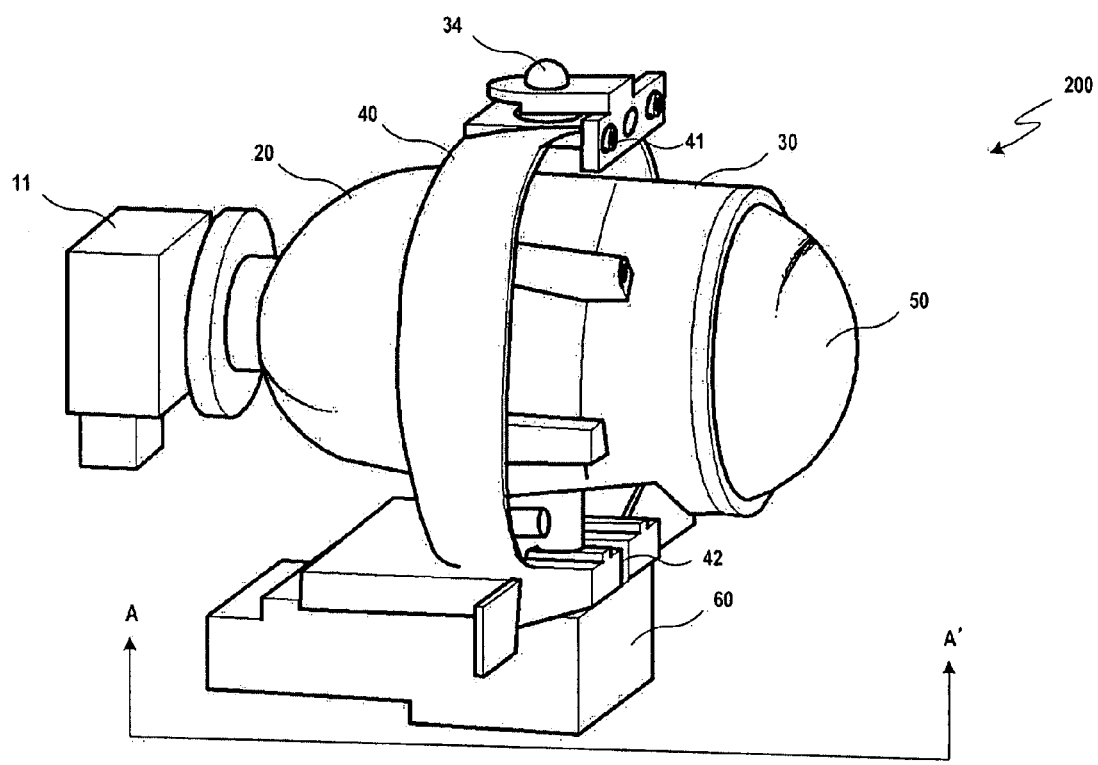
FIG. 8 is a perspective view of a lamp assembly manufactured by assembling the components in the perspective exploded view of FIG. 2.

FIG. 8 is a perspective view of a lamp assembly formed by assembling components, as shown in the perspective exploded view of FIG. 2. In FIG. 8, the fixed unit 40, the rotative actuator 60 fixed to the fixed unit 40, the upper bracket 32, the lower bracket 130, and the cover 34 are fixed, but the other components represented by other numerical references integrally rotate with the rotary unit 30.

Figure 9:
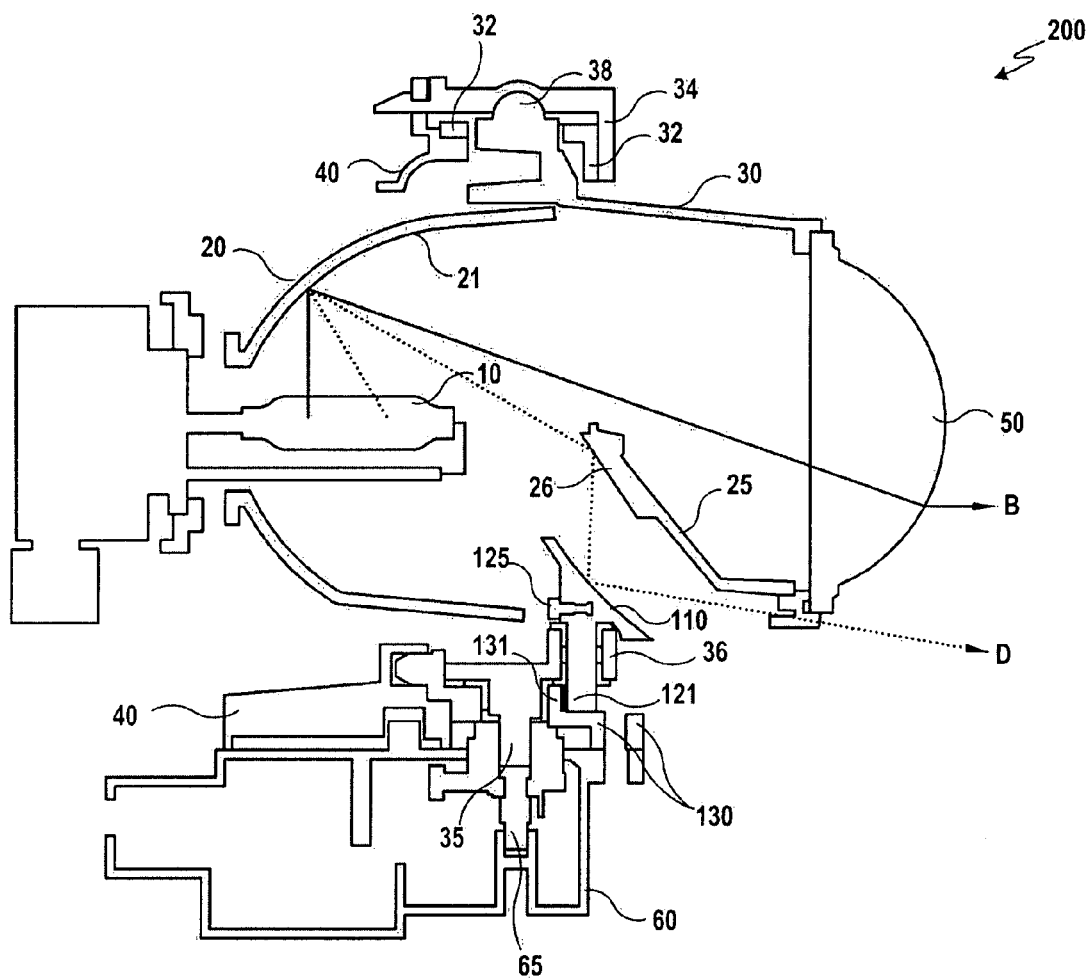
FIG. 9 is a vertical cross-sectional view of the lamp assembly of FIG. 8 taken along a line A-A'.

FIG. 9 is a vertical cross-sectional view of the lamp assembly 200 of FIG. 8 taken along a line A-A'. The combination relationship of each component is made clearer referring to FIG. 9. For example, it can be seen that the lower rotational shaft 35 is directly connected with a driving shaft 65 of the actuator and the fixed unit 40 is fixed to the rotative actuator 60.

Further, FIG. 9 also shows paths of light emitted from the light source 10. Light that is emitted from the light source 10 and reflected from the main reflecting mirror 21 is divided into light (path B) that passes above the shield unit 25 and the lens 50 and then forms a specific low beam pattern, and light (path D) that is reflected from the inverse reflecting mirror 26 on the rear surface of the shield unit and then reflected outside from the additional reflecting mirror 110. Each light travels in respect to a proportional rotational direction by the driving system. The optical mechanism used for the additional reflection is described later in reference to FIGS. 11 through 15.

Figure 10:
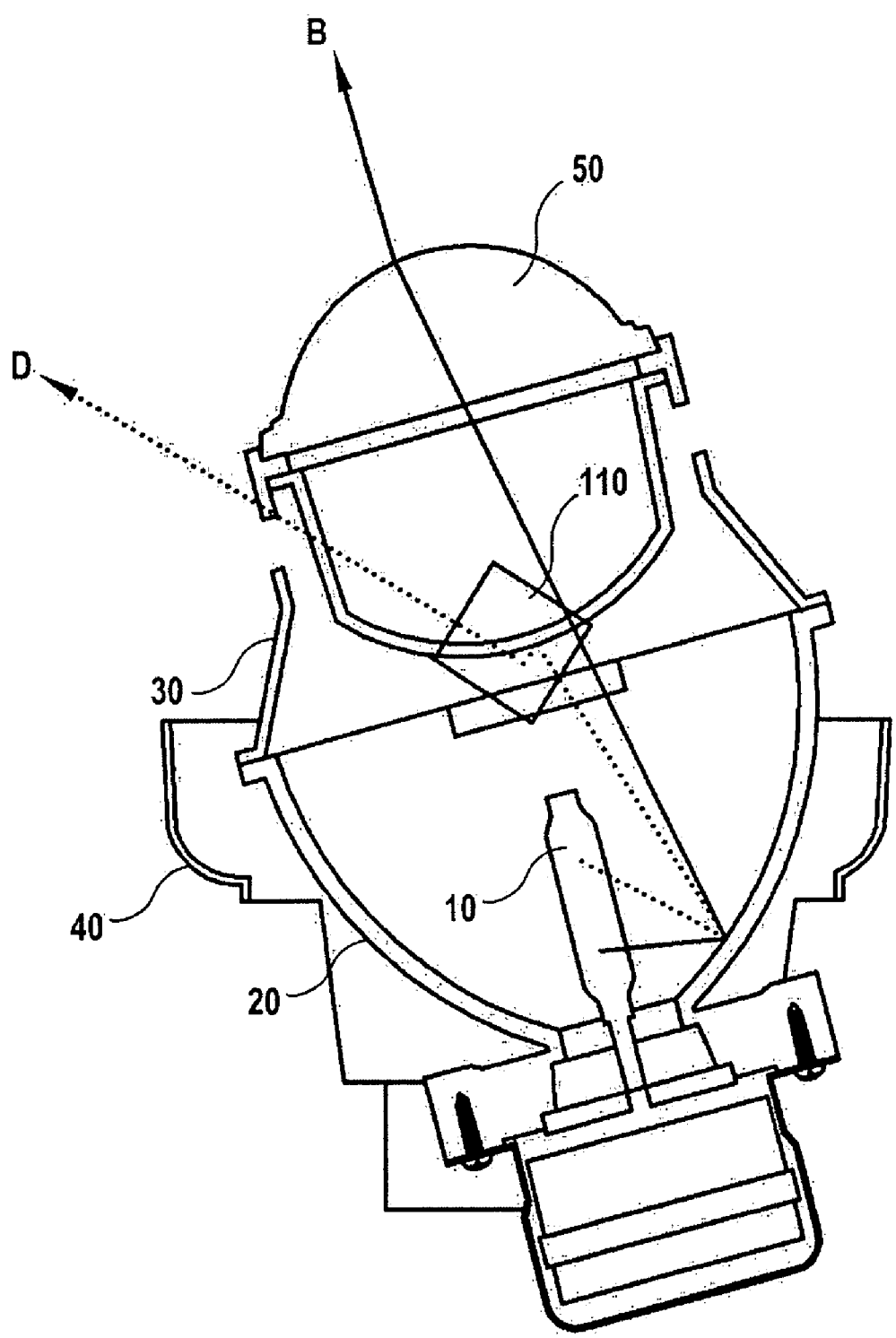
FIG. 10 is a view of the reflection path of FIG. 9 constructed in a cross-sectional view of the lamp assembly.

FIG. 10 is a view showing the paths of FIG. 9 in a cross-sectional view of the lamp assembly 200. As shown in FIG. 10, as the rotary unit 30 and the reflector unit 20 coupled with the rotary unit rotate at a predetermined angle, the additional reflecting mirror 110 rotates at an angle more than the above predetermined angle due to additional rotational angle. Therefore, light traveling along a path C is reflected from the additional reflecting mirror 110 and travels through the lower opening 37 of the rotary unit 30, and then forms a side beam pattern by turning at an angle more than the path B by the planetary gear 121. A variety of beam patterns can be formed according to the design of the reflecting surface of the additional reflecting mirror.

Figure 11:
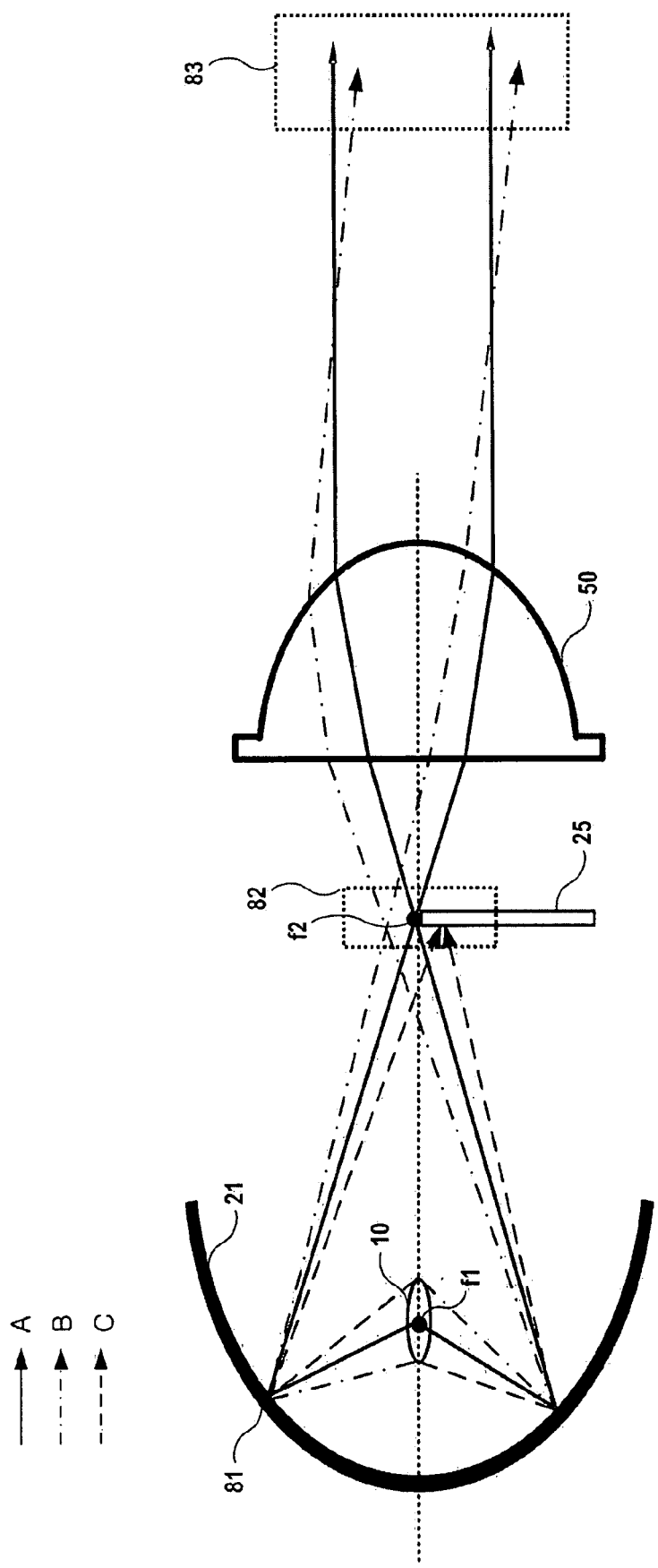
FIGS. 11 to 13 are views illustrating an optical mechanism of a beam pattern radiated by a conventional projection module.
Figure 12:
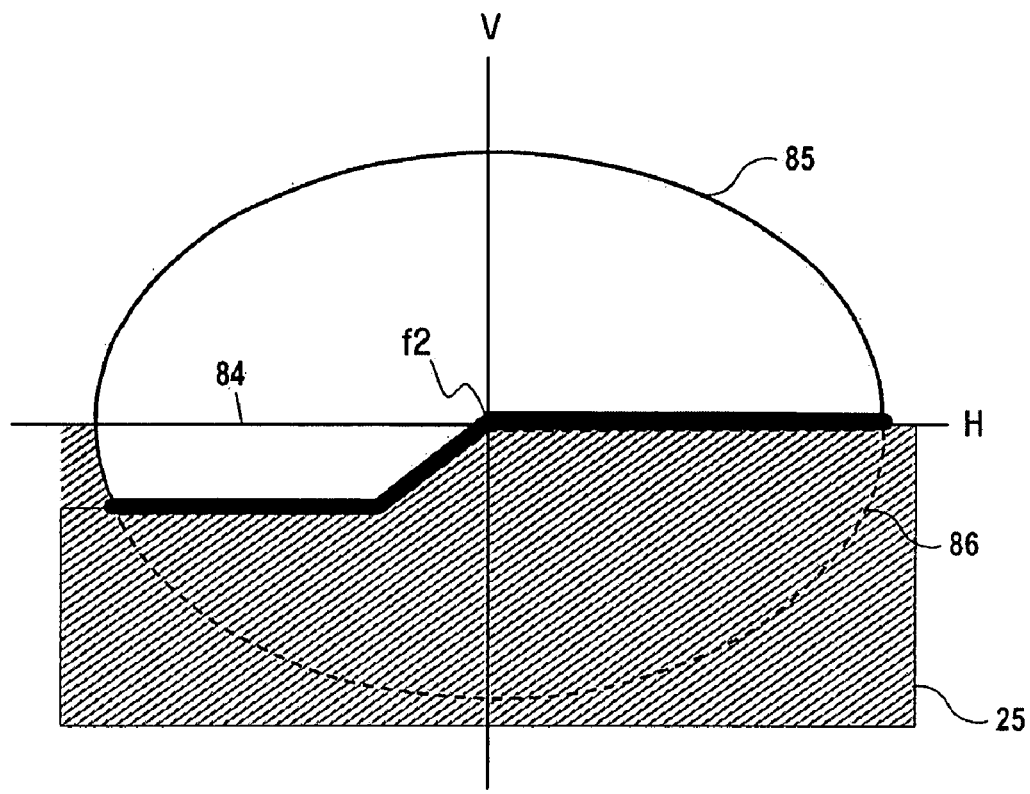
Figure 13:
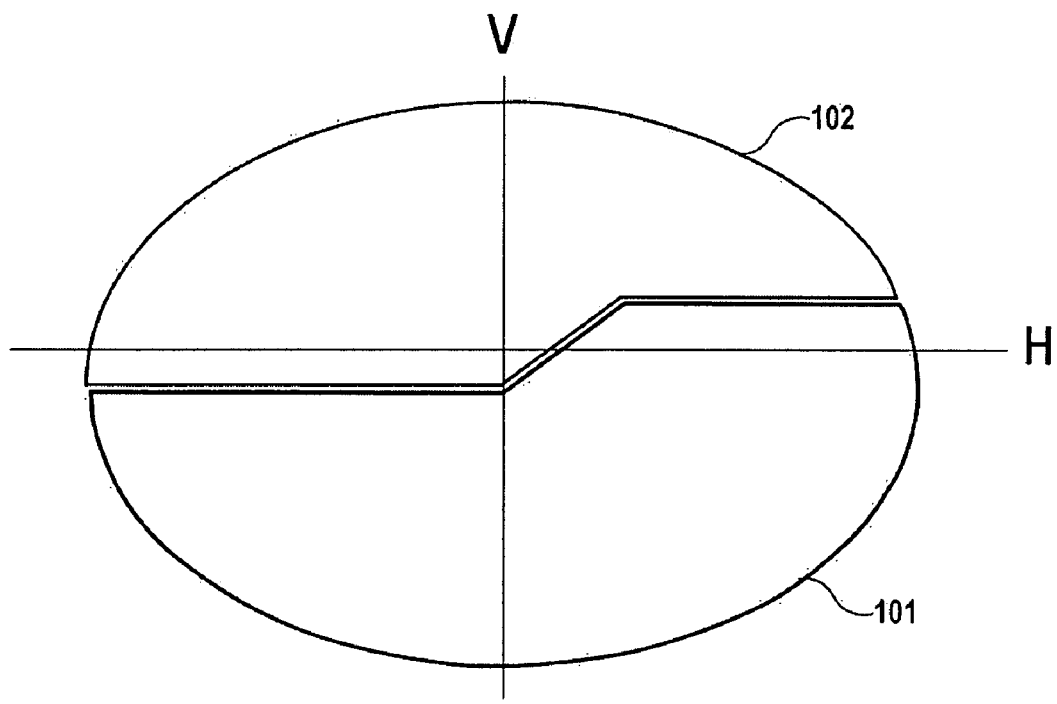

FIGS. 11 to 13 are views illustrating an optical mechanism of a beam pattern radiated from a conventional projection lamp module. Referring to FIG. 11, light emitted from the light source 10 forms a filament area with respect to the first focus f1 of the elliptical main reflecting mirror 21. All of the light emitted from the light source does not pass exactly through the second focus f2 of the ellipsis due to the emitting area. However, after reflected from a tangential plane of a point 81 on the main reflecting mirror 21, the light spreads again around the second focus f2 as much as the angle formed by the emitting area. In the light that is reflected and then spreads, light that passes the second focus f2 on the upper end of the shield unit 25 is refracted by the lens 50 and then travels straight toward the front area (path A). Further, because the upper end of the shield unit 25 has a specific outline, light that passes above the second focus f2 on the upper end of the shield unit without being intercepted by the shield unit 25 travels downward somewhat after passing the lens (path B). On the contrary, light that travels toward the part under the second focus and is intercepted by the shield unit 25 passes the lens 50 and then travels upward (path C, high beam).

Seen from the main reflecting mirror 21, an image of a projection 82 formed in the vicinity of the shield after the light with the area out of the light source is reflected from the point 81 on the main reflecting mirror 21 appears as shown in FIG. 12. The light traveling along the paths A and B of FIG. 11 without being intercepted by the shield unit 25 forms a projection 85 of a region around the second focus above the shield unit 25. On the contrary, the light reflected from the main reflecting mirror 21 toward the lower region 86 of the shield unit 25 is intercepted by the rear surface of the shield.

FIG. 13 is a view of an image formed by light that passes around the second focus f2 along various paths of light and is projected on a distribution screen at a predetermined distance. The light 84, 85 that is not intercepted by the shield unit 25 with a specific outline forms a low beam pattern 101 after passing the lens (50 of FIG. 11) by reversing at the second focus. If the shield unit 25 is removed, the light that travels along the path under the second focus (path C of FIG. 11) would also pass the lens and then form a high beam pattern 102 in addition to the low beam pattern 101.

Figure 14:
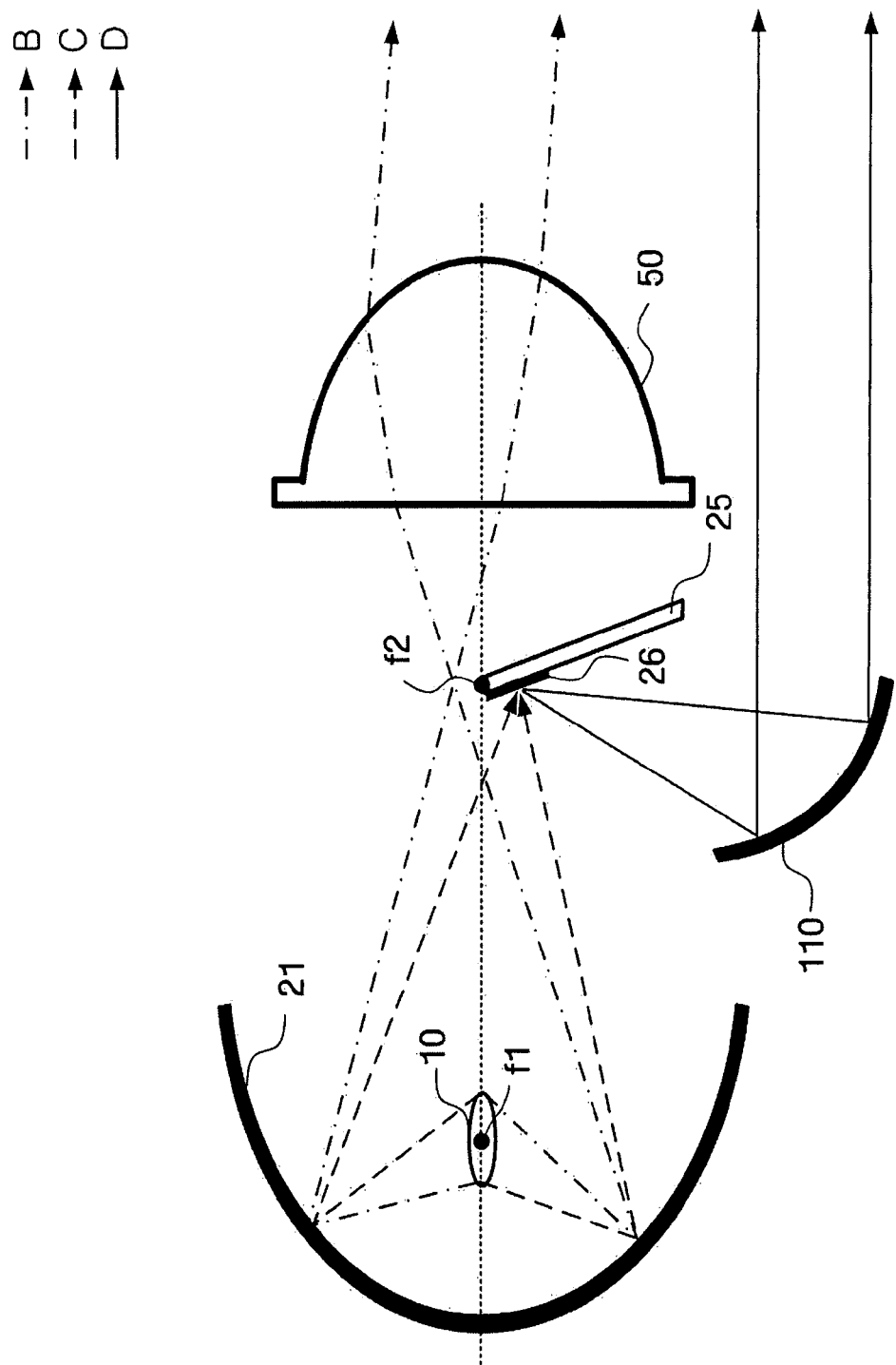
FIGS. 14 and 15 are views illustrating an optical mechanism for the lamp assembly according to the embodiment of the invention.
Figure 15:
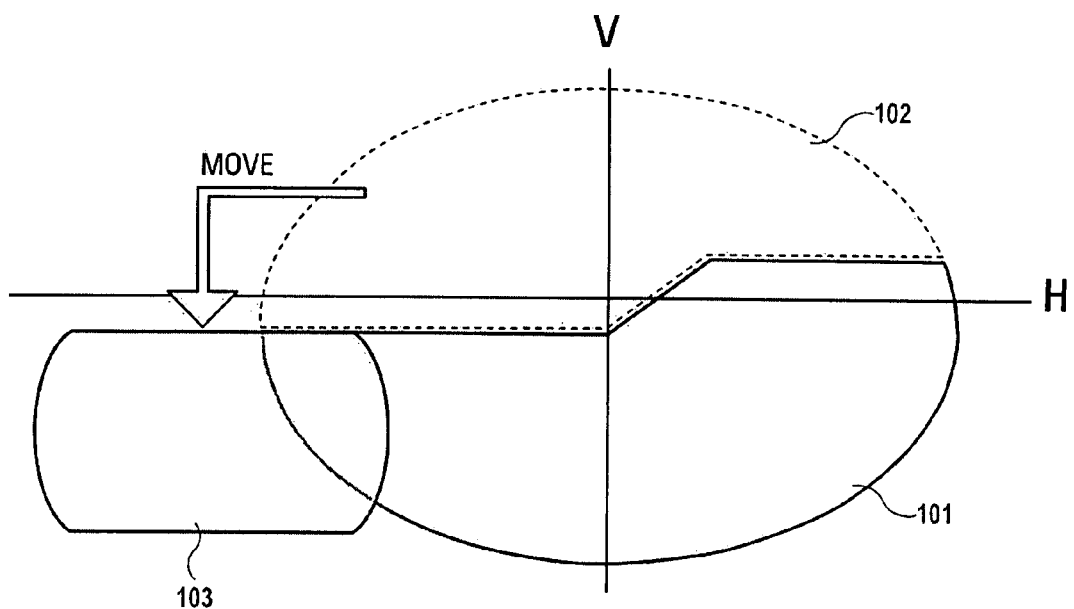

FIGS. 14 and 15 are views for illustrating an optical mechanism used in the invention. The lamp assembly 200 according to an embodiment of the invention includes the inverse reflecting mirror 26 on the rear surface of the shield unit and the additional reflecting mirror 110 to be driven under the shield unit. According to the embodiment of the invention, light that travels under the second focus without being intercepted by the shield unit (path C) can travel outside through the inverse reflecting mirror 26 on the rear surface of the shield unit 25 and the additional reflecting unit 110 (path D). The light to form the high beam pattern (102 of FIG. 15) on the path C becomes the light on the path D that passes the reflecting mirrors 26,110, which in turn forms an additional side beam pattern 103 in addition to the low beam pattern 101. As a result, according to an embodiment of the invention, the additional beam pattern 103 that is converted from the part intended to form the high beam pattern 102 by intercepting it with the shield to expand the low beam pattern 101 for a curved road can be obtained by using the reflecting mirrors 26, 110.

Figure 16A:
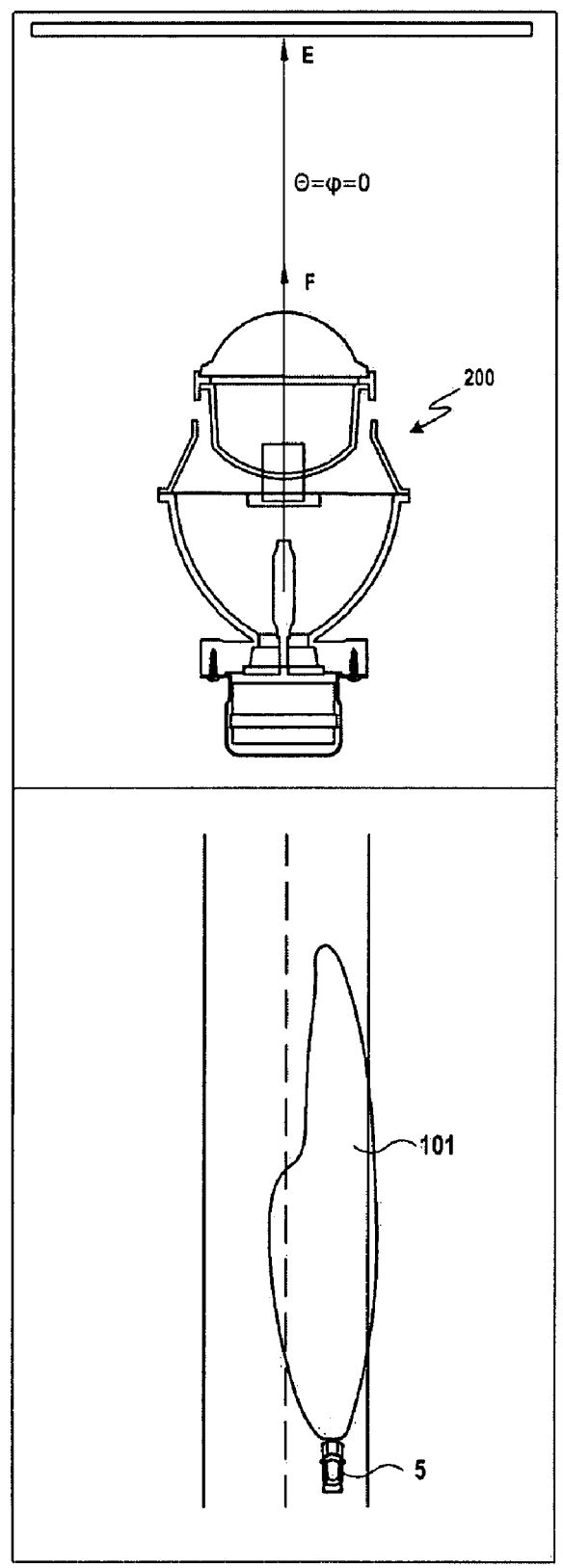
FIG. 16A to 16D are views showing the beam patterns formed by the lamp assembly under a variety of road conditions.

FIGS. 16A to 16D are views of beam patterns formed by the lamp assembly 200 for a variety of road conditions. As for a straight road as shown in FIG. 16A, a rotational angle φ and a revolutionary angle θ are zero. Under the above condition, light reflected from the additional reflecting mirror 110 is intercepted by the shield unit 25 and does not travel outside. When the additional reflecting mirror 110 faces the center of the shield unit 25, the reflected light is intercepted by the shield unit 25; however, when it rotates left or right above a predetermined critical angle from the center of the additional reflecting mirror 110, the reflected light travels outside accordingly, not intercepted by the shield unit 25.

Figure 16B:
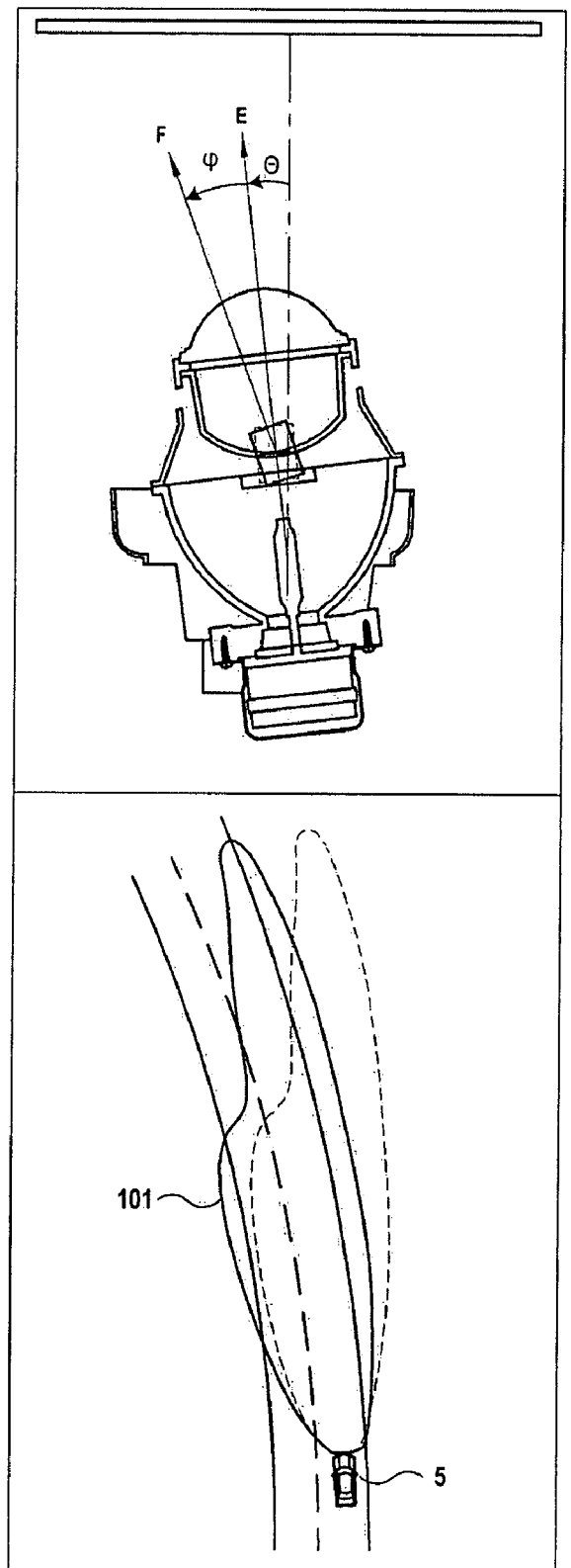

As shown in FIG. 16B, the rotational angle φ of the additional reflecting mirror shaft 120 when the road curved with a small curvature is present, but the additional beam pattern is not clear yet as compared with the low beam pattern because the additional light coming out of the opening is still weak.

Figure 16C:
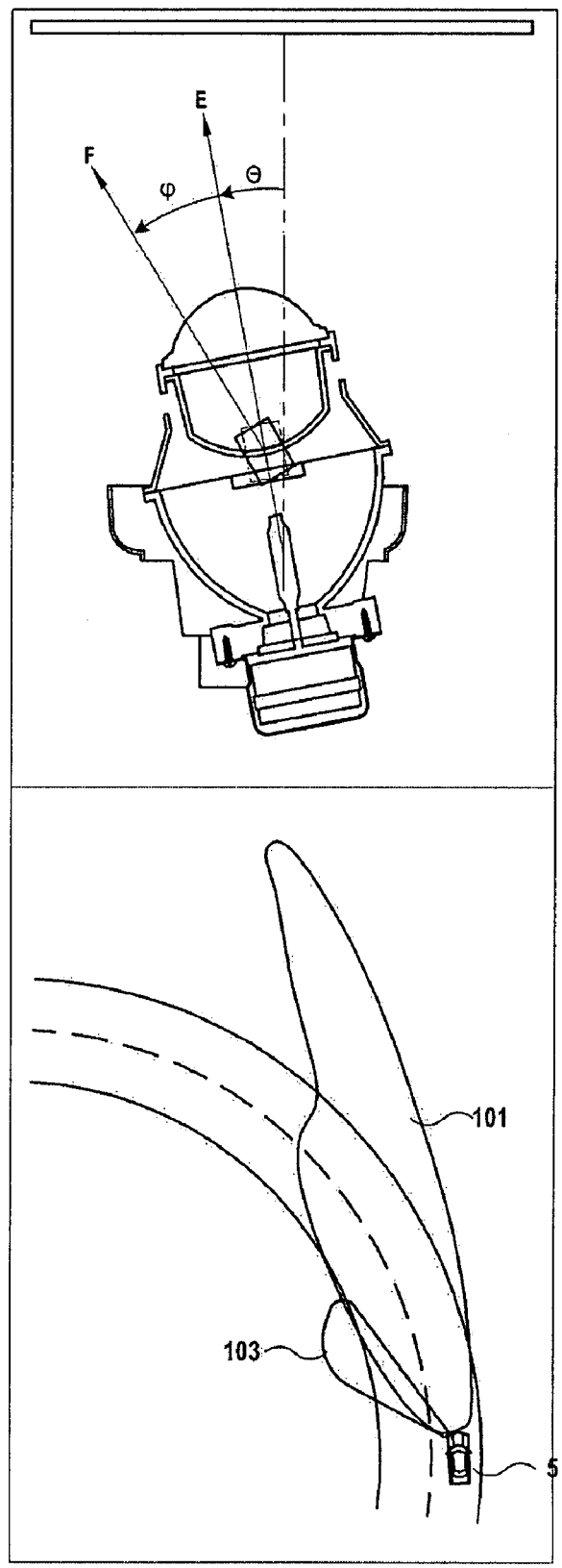

As shown in FIG. 16C, the large rotational angle φ appears when the road curves with a large curvature, in which the rotational angle φ exceeds a critical angle, where the reflected light is intercepted by the shield, the additional beam pattern 103 gradually starts to be formed and increases in size.

Figure 16D:
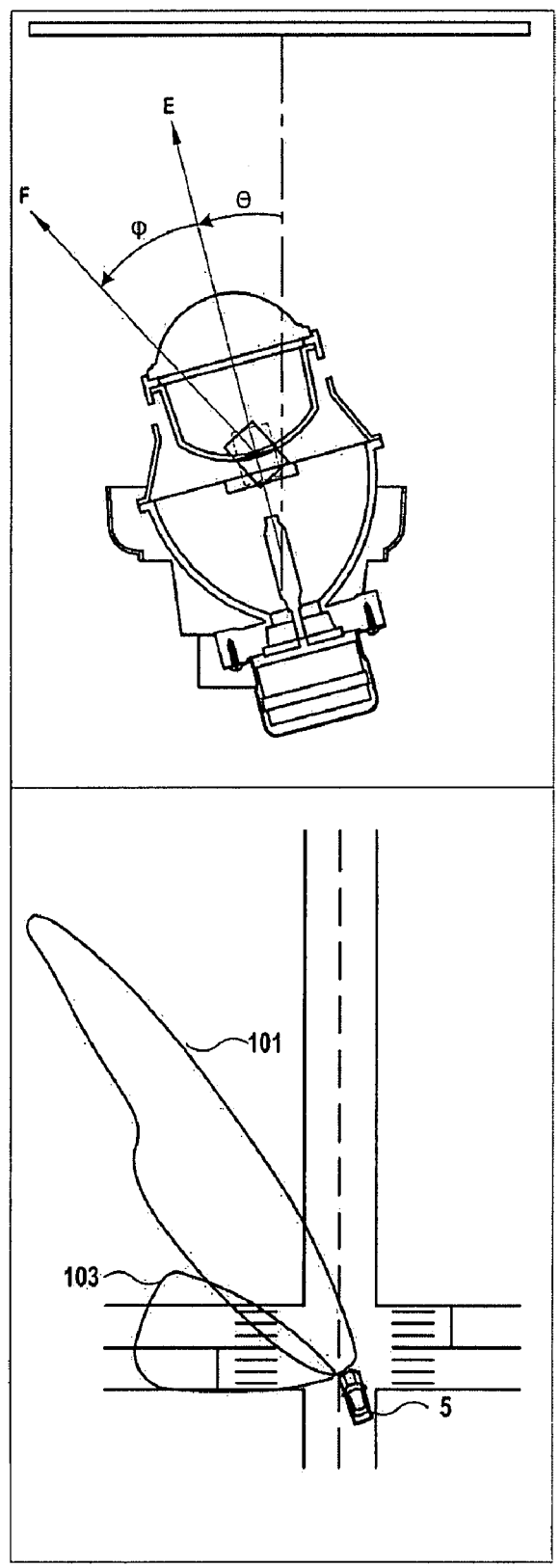

Further, as shown in FIG. 16D, at crossroads with a considerably large curvature, the revolutionary angle θ of the lamp reaches the maximum and the light reflected from the additional reflecting mirror 10 travels to a region widened at a side with respect to the maximum angle direction ($\phi_{max}$+ $\theta_{max}$).

As described above, the lamp assembly 200 according to the above embodiment of the invention can not only dynamically control the direction of an additional beam pattern, but form and gradually increase the beam pattern in size over the conventional technology that turns a main light shaft according to the curvature of curved roads.

As described above, according to a lamp assembly of an embodiment of the invention, not only a main light shaft of the lamp, but the amount and direction of the radiation of an additional beam pattern can be dynamically controlled. Further, an additional beam pattern is formed by reusing light that is intercepted by a shield unit, so that an integrated function in a single projection module can be achieved. Therefore, a different quality due to different light sources can be overcome because the same light source is used, and light can be naturally radiated to a side because the additional beam pattern is dynamically gradually formed. Accordingly, it can provide a driver with improved safety in driving on a curved road or at crossroads at night.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. A lamp assembly comprising:
    a projection lamp module including a light source, a reflecting mirror reflecting light emitted from the light source forward, and a lens refracting and condensing the forward reflected light;
    a rotative actuator rotating the module about a predetermined driving axis;
    a shield unit intercepting a part of the light emitted from the light source, the shield unit being provided with an inverse reflecting mirror disposed on an outer surface of the shield unit facing the light source and reflecting the light intercepted by the shield unit downward to form a low beam pattern; and
    an additional reflecting mirror rotating with the module and reflecting the light reflected by the inverse reflecting mirror to make the light travel outside through an opening provided at a position below the shield unit at an angle in a direction proportionate to the rotation of the module so as to form an additional beam pattern at a lateral side of the low beam pattern,
    wherein a rotational angle of the additional reflecting mirror is larger than a rotational angle of the module.

2. The lamp assembly of claim 1, wherein a ratio of rotational angles of the module and the additional reflecting mirror is constant regardless of the rotational angle of the module.

3. The lamp assembly of claim 1, further comprising a fixed unit Supporting a driving shaft of the rotative actuator.

4. The lamp assembly of claim 3, wherein a fixed sun gear around the driving shaft is engaged with a planetary gear that rotates about a rotational axis passing a focus of an additional reflecting minor, such that the planetary gear rotates and revolves, which allows the additional reflecting mirror to rotate.

5. The lamp assembly of claim 1, further comprising:
    a lower bracket having the sun gear at the upper portion and a cylindrical hole at the center of the sun gear to insert the driving shaft of the lamp module therein; and an additional reflecting mirror shaft with the planetary gear engaged with the sun gear at one end and the additional reflecting minor fixed at the other end.

6. The lamp assembly of claim 5, wherein the additional reflecting mirror shaft is inserted in the cylindrical hole formed at a position in the lamp module that is off-set at a predetermined distance forward from the driving shaft.

7. The lamp assembly of claim 5, wherein the gear ratio of the sun gear and the planetary gear is the same ratio of a rotational angle and a revolutionary angle of the additional reflecting minor shaft.

8. The lamp assembly of claim 1, wherein the lamp is a projection lamp and the lens is an aspherical lens.

* * * * *